(No Model.)

A. C. CLAUSEN.
BUTTON FASTENER.

No. 321,690. Patented July 7, 1885.

Attest;
T. Walter Fowler,
H. B. Applewhaite

Inventor;
Adler C. Clausen
per Attys.
A. N. Evans & Co.

UNITED STATES PATENT OFFICE.

ADLER C. CLAUSEN, OF MINNEAPOLIS, MINNESOTA, ASSIGNOR OF ONE-HALF TO J. C. SLAFTER, OF SAME PLACE.

BUTTON-FASTENER.

SPECIFICATION forming part of Letters Patent No. 321,690, dated July 7, 1885.

Application filed October 16, 1884. (No model.)

*To all whom it may concern:*

Be it known that I, ADLER C. CLAUSEN, a citizen of the United States, residing at Minneapolis, in the county of Hennepin and State of Minnesota, have invented certain new and useful Improvements in Button-Fasteners, of which the following is a full, clear, and exact description thereof, reference being had to the accompanying drawings, making a part of this specification, in which—

Figure 1:
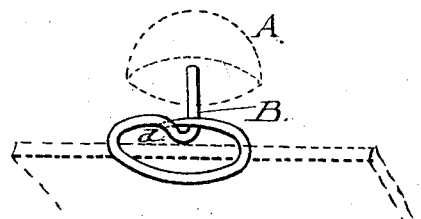
Figure 2:
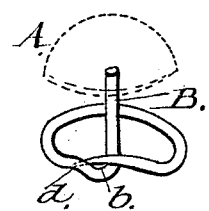
Figure 3:
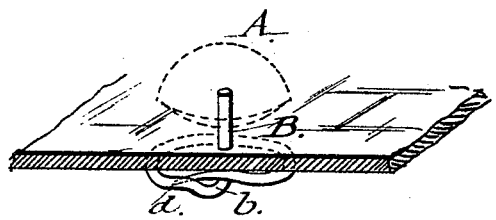

Figure 1 is a perspective view of my improved fastener applied. Fig. 2 is a side elevation of the fastener. Fig. 3 is a side elevation showing a button attached to a piece of goods.

The object of my present invention is to produce a fastener by which buttons can be readily applied and secured; and it consists in attaching to the button a wire shank bent as hereinafter described and claimed.

To enable others to make and use my invention, I will now proceed to describe the exact manner in which I have carried it out.

In the drawings, A represents a button provided with my improved fastening. The shank B is provided with a bend or hook, $b$, and the wire, after being bent around into the form of a loop, as shown in the drawings, has its free end $d$ sharpened, so as to enable it to be readily passed through the cloth or other material when the free end is sprung into the bend $b$, as shown in each of the figures.

To secure a button to a piece of cloth, it is only necessary to pass the shank pointed end foremost once through the cloth, as shown in Fig. 3, or twice through the cloth, as shown in Fig. 1, and then spring the point into the hook or bend $b$.

Having thus described my invention, what I claim as new, and desire to secure by Letters Patent, is—

The improved button-fastener herein described, consisting of a wire shank provided with a fastening bend or hook, $b$, and bowed or bent therefrom in the form of a loop, terminating in a free end, $d$, whereby, and after the shank has been inserted in the cloth or other material, its free end $d$ is adapted to be sprung into the bend or loop $b$, substantially as and for the purpose set forth.

ADLER C. CLAUSEN.

Witnesses:
A. E. HAMMOND,
L. E. KELLEY.